United States Patent
Akl et al.

(10) Patent No.: US 12,457,663 B2
(45) Date of Patent: Oct. 28, 2025

(54) CONFIGURING UPLINK (UL) TRANSMISSIONS DURING CELL DISCONTINUOUS RECEPTION (DRX)

(71) Applicant: QUALCOMM Incorporated, San Diego, CA (US)

(72) Inventors: Naeem Akl, Bridgewater, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/339,682

(22) Filed: Jun. 22, 2023

(65) Prior Publication Data

US 2024/0430976 A1 Dec. 26, 2024

(51) Int. Cl.
*H04W 76/28* (2018.01)
*H04W 72/1268* (2023.01)

(52) U.S. Cl.
CPC ....... *H04W 76/28* (2018.02); *H04W 72/1268* (2013.01)

(58) Field of Classification Search
CPC ... H04W 76/28; H04W 72/1268; Y02D 30/70
See application file for complete search history.

(56) References Cited

U.S. PATENT DOCUMENTS

| | | | | |
|---|---|---|---|---|
| 10,165,617 | B2* | 12/2018 | Chen | H04W 76/28 |
| 10,342,063 | B2* | 7/2019 | Bergquist | H04W 52/0216 |
| 2014/0086112 | A1* | 3/2014 | Stern-Berkowitz | H04L 1/1822 370/280 |
| 2016/0081020 | A1* | 3/2016 | Rahman | H04W 24/10 370/311 |
| 2018/0160470 | A1* | 6/2018 | Rune | H04W 76/28 |
| 2024/0114451 | A1* | 4/2024 | He | H04W 52/0229 |
| 2024/0430976 | A1* | 12/2024 | Akl | H04W 72/1268 |
| 2025/0203707 | A1* | 6/2025 | Tsai | H04W 76/28 |

* cited by examiner

*Primary Examiner* — Abdullahi E Salad
(74) *Attorney, Agent, or Firm* — Kevin M. Donnelly; Seyfarth Shaw LLP

(57) ABSTRACT

A method for wireless communication by a UE includes receiving, from a network node, a first message indicating at least a first discontinuous reception (DRX) configuration associated with a DRX cycle at the network node. The DRX cycle may be enabled or disabled in accordance with whether the first DRX configuration is in an activated state. The method also includes receiving, from the network node, a second message indicating a group of uplink (UL) transmission configurations including at least a first UL configuration associated with the activated state of the first DRX configuration and a second UL configuration associated with the deactivated state of the first DRX configuration. The method further includes transmitting, to the network node, a third message in accordance with the first UL configuration in accordance with first DRX configuration being activated or the second UL configuration in accordance with first DRX configuration being deactivated.

30 Claims, 9 Drawing Sheets

CONFIGURING UPLINK (UL) TRANSMISSIONS DURING CELL DISCONTINUOUS RECEPTION (DRX)

FIELD OF THE DISCLOSURE

The present disclosure relates generally to wireless communication, and more specifically to configuring uplink (UL) transmissions during cell discontinuous reception (DRX).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some examples, a network node may allocate a group of uplink (UL) transmission resources to a user equipment (UE). Although the UE might not fully utilize all of the allocated UL transmission resources, the network node may continuously monitor for UL transmissions from the UE in accordance with the allocated UL transmission resources, resulting in unnecessary power consumption at the network node. In some examples, the network node may enable a discontinuous reception (DRX) mode to reduce power consumption at the network node. By utilizing the DRX mode, the network node can periodically monitor UL transmissions instead of engaging in constant monitoring, thereby reducing unnecessary power usage.

SUMMARY

In one aspect of the present disclosure, a method for wireless communication by a UE includes receiving, from a network node, a first message indicating at least a first discontinuous (DRX) configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The method still further includes receiving, from the network node, a second message indicating a group of UL transmission configurations including at least a first UL configuration associated with the activated state of the first DRX configuration and a second UL configuration associated with the deactivated state of the first DRX configuration. The method also includes transmitting, to the network node, a third message in accordance with the first UL configuration in accordance with first DRX configuration being activated or the second UL configuration in accordance with first DRX configuration being deactivated.

Another aspect of the present disclosure is directed to an apparatus including means for receiving, from a network node, a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The apparatus further includes means for receiving, from the network node, a second message indicating a group of UL transmission configurations including at least a first UL configuration associated with the activated state of the first DRX configuration and a second UL configuration associated with the deactivated state of the first DRX configuration. The apparatus further includes means for transmitting, to the network node, a third message in accordance with the first UL configuration in accordance with first DRX configuration being activated or the second UL configuration in accordance with first DRX configuration being deactivated.

In another aspect of the present disclosure, a non-transitory computer-readable medium with non-transitory program code recorded thereon is disclosed. The program code is executed by a processor and includes program code to receive, from a network node, a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The program code still further includes program code to receive, from the network node, a second message indicating a group of uplink (UL) transmission configurations including at least a first UL configuration associated with the activated state of the first DRX configuration and a second UL configuration associated with the deactivated state of the first DRX configuration. The program code also includes program code to transmit, to the network node, a third message in accordance with the first UL configuration in accordance with first DRX configuration being activated or the second UL configuration in accordance with first DRX configuration being deactivated.

Another aspect of the present disclosure is directed to a UE having a one or more processors; and one or more memories coupled with the one or more processors and storing processor-executable code that, when executed by the one or more processors, is configured to cause the UE to receive, from a network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. Execution of the processor-executable code further causes the UE to receive, from the network node, a second message indicating a group of UL transmission configurations including at least a first UL configuration associated with the activated state of the first DRX configuration and a second UL configuration associated with the deactivated state of the first DRX configuration. Execution of the processor-executable code also causes the UE to transmit, to the network node, a third message in accordance with the first UL configuration in accordance with first DRX configuration being activated or the second UL configuration in accordance with first DRX configuration being deactivated.

In one aspect of the present disclosure, a method for wireless communication by a network node includes transmitting a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The method still further includes transmitting a second message indicating a group of UL transmission configurations including at least a first UL configuration associated with the activated state of the first DRX configuration and a second UL configuration associated with the deactivated state of the first DRX configuration. The method also includes receiving, from a UE, a third message in accordance with the first UL configuration in accordance with first DRX configuration being activated or the second UL configuration in accordance with first DRX configuration being deactivated.

Another aspect of the present disclosure is directed to an apparatus including means for transmitting a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The apparatus further includes means for transmitting a second message indicating a group of UL transmission configurations including at least a first UL configuration associated with the activated state of the first DRX configuration and a second UL configuration associated with the deactivated state of the first DRX configuration. The apparatus further includes means for receiving, from a UE, a third message in accordance with the first UL configuration in accordance with first DRX configuration being activated or the second UL configuration in accordance with first DRX configuration being deactivated.

In another aspect of the present disclosure, a non-transitory computer-readable medium with non-transitory program code recorded thereon is disclosed. The program code is executed by a processor and includes program code to transmit a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. The program code still further includes program code to transmit a second message indicating a group of UL transmission configurations including at least a first UL configuration associated with the activated state of the first DRX configuration and a second UL configuration associated with the deactivated state of the first DRX configuration. The program code also includes program code to receive, from a UE, a third message in accordance with the first UL configuration in accordance with first DRX configuration being activated or the second UL configuration in accordance with first DRX configuration being deactivated.

Another aspect of the present disclosure is directed to a network node having a one or more processors; and one or more memories coupled with the one or more processors and storing processor-executable code that, when executed by the one or more processors, is configured to cause the network node to transmit a first message indicating at least a first discontinuous reception (DRX) configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. Execution of the processor-executable code further causes the network node to transmit a second message indicating a group of UL transmission configurations including at least a first UL configuration associated with the activated state of the first DRX configuration and a second UL configuration associated with the deactivated state of the first DRX configuration. Execution of the processor-executable code also causes the network node to receive, from a UE, a third message in accordance with the first UL configuration in accordance with first DRX configuration being activated or the second UL configuration in accordance with first DRX configuration being deactivated.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
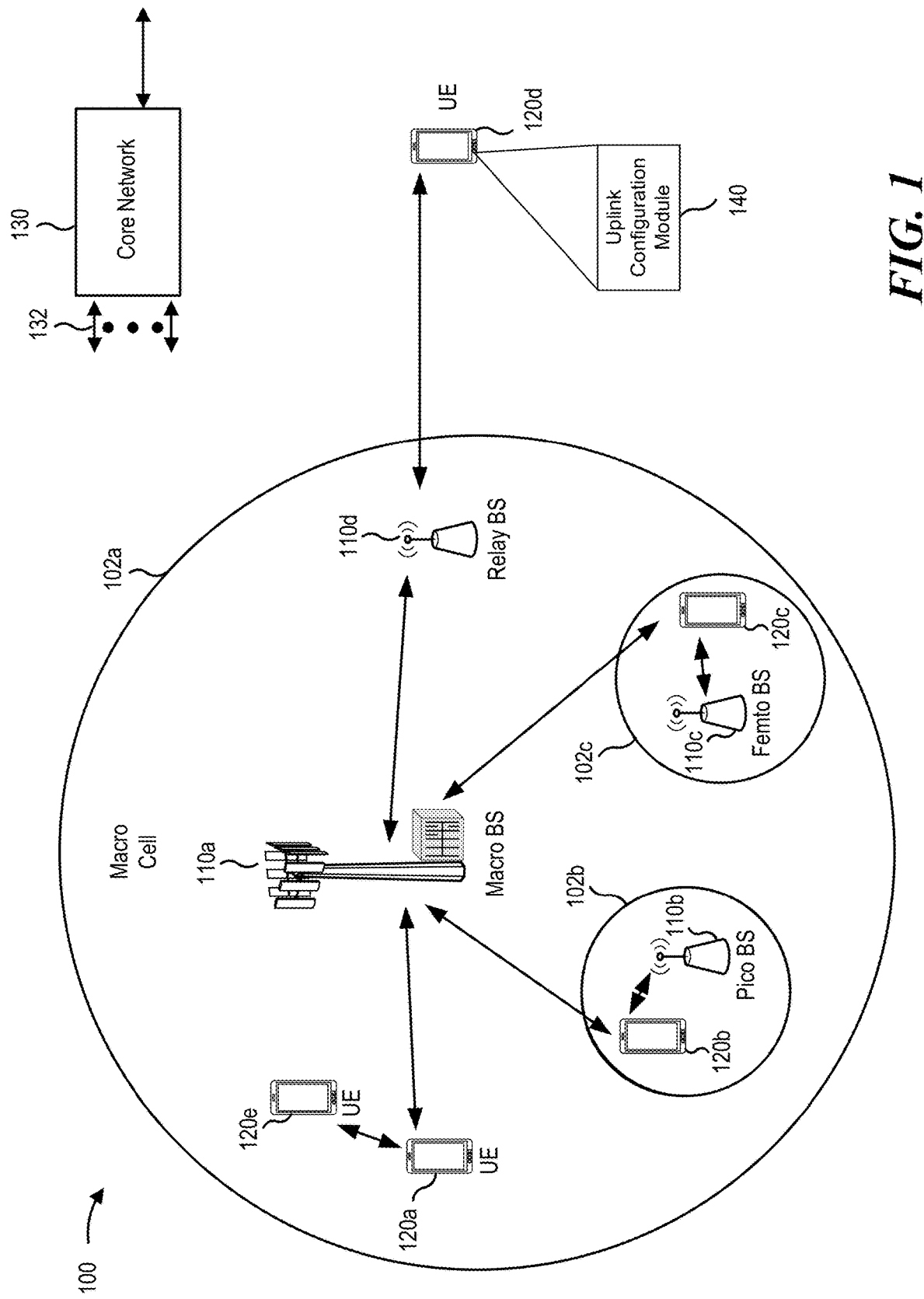
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As discussed, in some examples, a network node may allocate a group of uplink transmission resources to a user equipment (UE). Some conventional network nodes may continuously monitor for uplink transmissions from the UE in accordance with the allocated uplink transmission resources, resulting in unnecessary power consumption at the network node. In some examples, the network node may enable a discontinuous reception (DRX) configuration to reduce power consumption at the network node. By activating the DRX configuration, the network node may periodically monitor for UL transmissions, instead of continuously monitoring for uplink transmissions, thereby minimizing unnecessary power usage. The DRX configuration associated with the network node may be referred to as a cell-DRX mode (hereinafter, used interchangeably). The cell-DRX configuration may be associated with a DRX cycle, which includes one or more DRX-on time intervals and one or more DRX-off time intervals. The network node monitors for uplink transmissions during each DRX-on interval, and the network node may enter a sleep state during each DRX-off time interval.

In some examples, the activated cell-DRX configuration may impact unscheduled uplink transmissions, such as scheduling requests (SRs). For example, the network node may fail to decode an unscheduled uplink transmission if the unscheduled uplink transmission occurs during one of the DRX-off time intervals. Consequently, the UE may need to re-transmit the unscheduled uplink transmission until the network node successfully decodes the unscheduled uplink transmission. These re-transmissions may increase UE power consumption and result in increased network overhead.

Various aspects of the present disclosure are directed to dynamically selecting an uplink configuration, by the UE, in accordance with a current state of a cell-DRX configuration associated with a network node. The state of the cell-DRX configuration includes an activated state and a deactivated state. A cell-DRX cycle associated with the cell-DRX configuration may be enabled, at the network node, in accordance with the cell-DRX configuration being in an activated state. The DRX cycle may be disabled, at the network node, in accordance with the cell-DRX configuration being in a deactivated state. When enabled, the cell-DRX cycle switches between a cell-DRX-on state and a cell-DRX-off state in accordance with one or more pre-configured parameters. In some examples, the network node may transmit, to the UE, a first message indicating the cell-DRX configuration. The network node may also transmit, to the UE, a second message indicating a group of uplink transmission configurations including at least a first uplink configuration associated with the activated state of the first DRX configuration and a second uplink configuration associated with the deactivated state of the first DRX configuration. The UE may then transmit, to the network node, a third message in accordance with one of the group of uplink configurations corresponding to a current state of the cell-DRX configuration. For example, the third message may be transmitted in accordance with the first uplink configuration based on the cell-DRX configuration being activated or the second UL configuration based on the cell-DRX configuration being deactivated. In some examples, the network node may transmit a radio resource control (RRC) message indicating whether the cell-DRX is activated or when the cell-DRX configuration will be activated. In other examples, the network node dynamically indicates whether the cell-DRX configuration is activated or deactivated.

Particular aspects of the subject matter described in this disclosure can be implemented to realize one or more of the following potential advantages. In some examples, the described techniques for transmitting from a network node, to a UE, one or more messages indicating a cell-DRX configuration and group of uplink configurations may reduce UE power consumption and decrease network overhead. For instance, by receiving a message indicating the cell-DRX configuration, the UE can dynamically select an uplink configuration associated with the current state of the cell-DRX configuration. As a result, the UE may transmit an uplink message during a time interval when the network node is actively monitoring for uplink transmissions. This reduces a number of uplink re-transmissions, thereby decreasing power consumption at the UE and reducing network overhead.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an uplink configuration module 140. For brevity, only one UE 120d is shown as including the uplink configuration module 140. The uplink configuration module 140 may perform various functions, such as one or more of the elements of the process 800 described with reference to FIG. 8.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120c) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
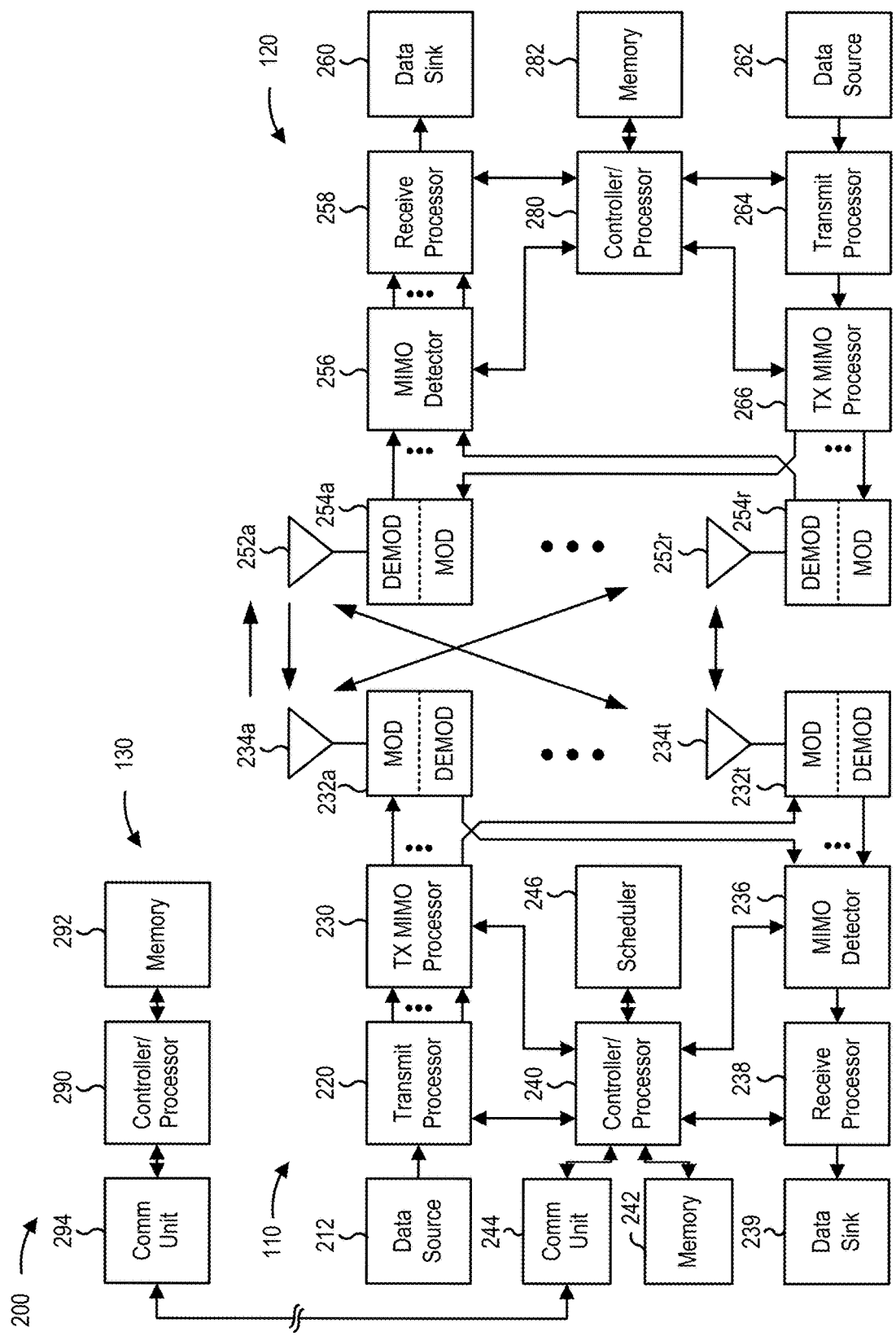
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with selecting an uplink configuration in accordance with a status of a cell-DRX configuration as described in more detail elsewhere. For example, the controller/processor 240 of the base station 110, the controller/processor 280 of the UE 120, and/or any other component(s) of FIG. 2 may perform or direct operations of, for example, the process 800 of FIG. 8 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
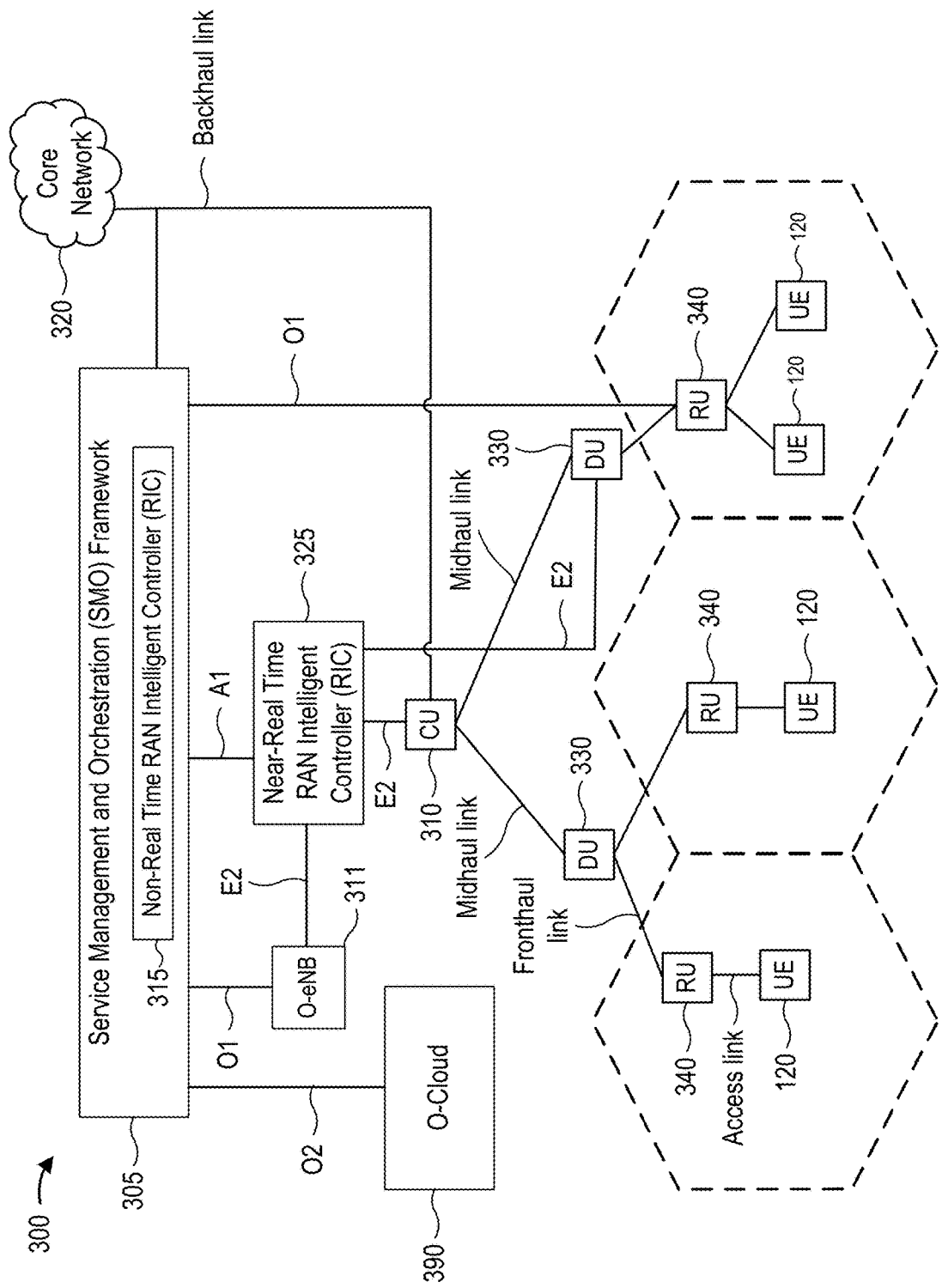
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

As discussed, various aspects of the present disclosure are directed to DRX, as well as discontinuous transmission (DTX) associated with a network node. The DRX configuration and DTX configuration associated with the network node may be referred to as a cell-DRX configuration and cell-DTX configuration, respectively. In some examples, the cell-DRX may not affect critical functions of a UE operating in accordance with, at least, 3GPP Release 18 and/or a legacy UE, such as a UE operating in accordance with 3GPP Release 17 or prior. Such critical functions may include random access channel (RACH) operations, paging operations, and/or system information blocks (SIBs) of idle and/or inactive UEs. Therefore, after receiving a cell-DRX configuration and/or a cell-DTX configuration, a connected state UE may still transmit a RACH message or receive one or more SIBs during a non-active time interval (for example, cell-DRX-off time interval) associated with a network node.

In some examples, a cell-DTX configuration may be different from a cell-DRX configuration. Each configuration may be transmitted via dedicated signaling to individual UEs. Thus, different UEs can receive different sets of configurations. Still, a single configuration for the network node (for example, cell) may apply to all UEs associated with the network node.

In some examples, the network node may schedule one or more uplink transmissions from one or more UEs. In such examples, the network node may not activate the cell-DRX configuration when the network node is actively monitoring for the one or more scheduled uplink transmissions. In some other examples, the network node may enable the cell-DRX configuration to reduce power consumption at the network node. The cell-DRX configuration may be associated with a DRX cycle at the network node. The DRX cycle may include a DRX-on time interval and a DRX-off time interval. The network node may monitor for uplink transmissions during the DRX-on time interval and may enter a sleep state during the DRX-off time interval. Activating the cell-DRX configuration may reduce power consumption at the network node because the network node may periodically monitor uplink transmissions instead of engaging in constant monitoring, thereby reducing unnecessary power usage. The activated cell-DRX mode may impact one or more unscheduled uplink transmissions, such as a scheduling request (SR), because the network node may fail to decode the unscheduled uplink transmissions if the one or more unscheduled transmissions are received during one or more DRX-off time intervals associated with the cell-DRX cycle. As a result, a UE may need to re-transmit the unscheduled uplink transmissions until the network node successfully decodes at least one of the unscheduled uplink transmissions. The re-transmissions may increase UE power consumption and may also increase network overhead.

Figure 4:
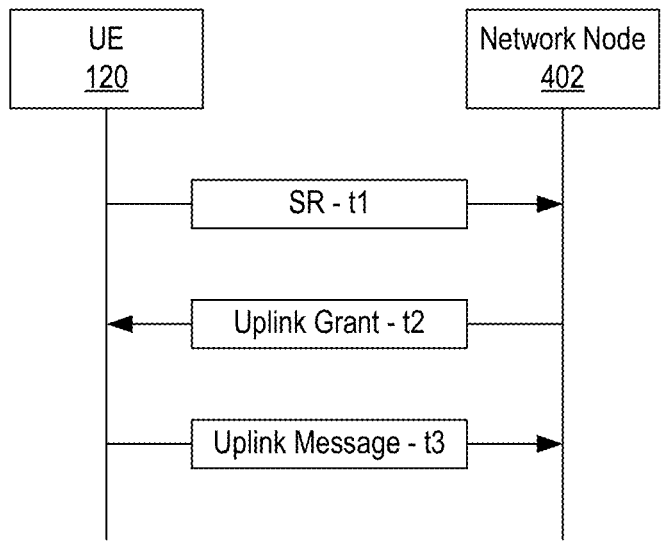
FIG. 4 is a timing diagram illustrating an example of transmitting a scheduling request that requests uplink shared channel (UL-SCH) resources, in accordance with various aspects of the present disclosure.

FIG. 4 is a timing diagram illustrating an example 400 of transmitting an SR for requesting uplink shared channel (UL-SCH) resources, in accordance with aspects of the present disclosure. In the 400 example of FIG. 4, the UE 120 may be served by a network node 402. The network node 402 may be an example of a base station 110 described with reference to FIGS. 1 and 2, or a CU 310, DU 330, or RU 340 described with reference to FIG. 3.

In some examples, a medium access control (MAC) entity associated with a UE 120 may be configured with zero, one, or multiple SR configurations, each of which includes a set of physical uplink control channel (PUCCH) resources for transmitting an SR across different bandwidth parts (BWPs) and cells. Each SR configuration corresponds to one or more logical channels, secondary cell (SCell) beam failure recovery, or consistent listen before talk (LBT) failure recovery. Each logical channel, SCell beam failure recovery, and consistent LBT failure recovery may be mapped to zero or one SR configurations. The mapping may be configured via RRC signaling.

As shown in the example 400, at time t1, the UE 120 may transmit an SR to the network node 402. The UE 120 may be configured with periodic resources on which it may transmit the SR. Still, the network node 402 does not know which of these periodic resources will be used by the UE 120. Therefore, the network node 402 may monitor for the SR on each of the periodic resources. At time t2, in response to receiving the SR from the UE 120, the network node 402 transmits, to the UE 120, an uplink grant allocating one or more resources for an uplink transmission. At time t3, the UE 120 may transmit an uplink message to the network node 402 in accordance with the one or more resources allocated via the uplink grant.

In the example 400, the uplink message transmitted at time t3 is a scheduled transmission. In contrast, the SR transmission at time t1 is an unscheduled transmission. Because the SR transmission is unscheduled, the network node 402 may monitor for the SR on each of the periodic resources scheduled for SR transmissions. Monitoring each of the periodic resources may increase power consumption at the network node 402. Therefore, having knowledge of transmission occasions at the UE 120 presents an opportunity for the network node 402 to reduce energy consumption. In some examples, the network node 402 may transmit, to the UE 120, a message indicating a cell-DRX configuration. The UE 120 may use the cell-DRX configuration to align the SR transmissions with active monitoring occasions (for example, on periods) of a cell-DRX cycle associated with the cell-DRX configuration. Aspects of the present disclosure are not limited to aligning SR transmissions with active monitoring occasions during the cell-DRX, the UE 120 may use the cell-DRX configuration to align other types of uplink transmissions with the active monitoring occasions of the cell-DRX cycle.

In some wireless communication systems, uplink resource grants can be categorized as either configured uplink grants or dynamic uplink grants. Configured uplink grants can further be classified as Type 1 or Type 2 grants. Type 1 grants may be received via RRC signaling, while Type 2 grants are received via a physical downlink control channel (PDCCH). Additionally, for Type 2 grants, layer one (L1) signaling can indicate whether the configured uplink grant is activated or deactivated. Both Type 1 and Type 2 grants may be configured via RRC signaling for a serving cell per bandwidth part (BWP). In some cases, multiple configurations may be simultaneously active within the same BWP. For Type 2 grants, activation and deactivation can be independent among the serving cells. Furthermore, within the same BWP, a MAC entity may be configured with both Type 1 and Type 2 grants, allowing for flexibility in resource allocation.

As discussed, in some cases, a UE may be allocated resources for one or more uplink transmissions, but the UE may not utilize all of the allocated resources. The resources may be allocated via a configured uplink grant or a dynamic uplink grant. In such cases, a network node may continuously monitor for uplink transmissions on all of the allocated resources, resulting in unnecessary power consumption at the network node. To reduce power consumption at the network node, a cell-DRX configuration may be activated at the network node. The cell-DRX configuration may restrict UE activity, allowing the cell to enter a sleep state or micro-sleep state, or reduce monitoring, thereby reducing power consumption at the network node. The cell-DRX configuration may be associated with one or more cell-DRX parameters, such as periodicity, offset, and/or duration of a cell-DRX-on time interval.

In some examples, the cell-DRX configuration may be transmitted from a network node, to one or more UEs, via RRC signaling. In other examples, the cell-DRX configuration may be dynamically activated and deactivated. The one or more UEs may receive signaling indicating whether the cell-DRX configuration is activated or deactivated. In some examples, a single cell-DRX configuration may apply to all uplink transmissions from a UE or a subset of uplink transmissions from a set of uplink transmissions from the UE. In other examples, one cell-DRX configuration may be associated with a specific UL configuration.

Figure 5:
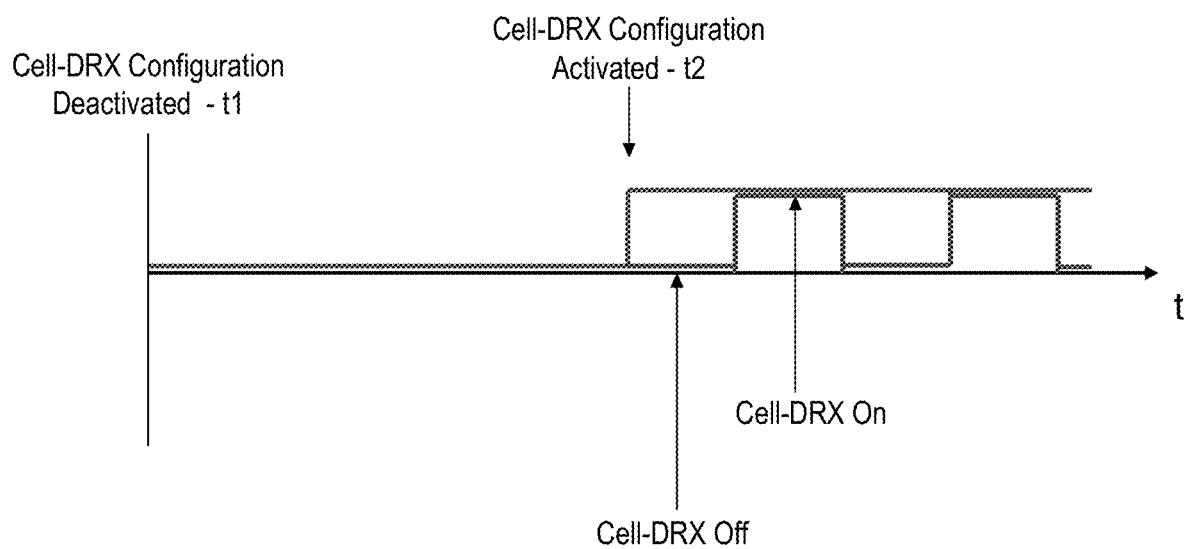
FIG. 5 is a timing diagram illustrating an example of activating a cell-discontinuous reception (DRX) configuration associated with a DRX cycle, in accordance with various aspects of the present disclosure.

FIG. 5 is a timing diagram illustrating an example 500 of activating a cell-DRX configuration associated with a DRX cycle, in accordance with aspects of the present disclosure. In FIG. 5, the x-axis represents time (t). The cell-DRX configuration may be one of a group of cell-DRX configurations, and the DRX cycle is associated with the network node corresponding with the cell-DRX configuration. Each one of the group of cell-DRX configurations may be associated with a respective set of cell-DRX parameters.

As shown in the example of FIG. 5, at time t1, the cell-DRX configuration is deactivated at the network node. During this period, the network node may continuously monitor for uplink transmissions on uplink resources allocated, by the network node, to one or more UEs. In some examples, when the cell-DRX configuration is deactivated, a UE associated with the network node performs uplink transmissions in accordance with a first uplink transmission configuration.

At time t2, the cell-DRX configuration is activated. In some examples, RRC signaling may indicate whether the cell-DRX configuration is activated and/or when the cell-DRX configuration will be activated. In other examples, a UE may receive dynamic signaling indicating the cell-DRX configuration is activated. Once activated, the cell-DRX configuration cycles between a cell-DRX-on time interval and a cell-DRX-off period. During each cell-DRX-on time interval, the network node actively monitors for uplink transmissions. However, during each cell-DRX-off time interval, the network node enters a sleep or micro-sleep state, effectively suspending the monitoring of uplink transmissions. This alternating pattern allows the network node to conserve energy during the cell-DRX-off time interval. To align with cell-DRX-on and off time intervals during the activated cell-DRX configuration, the UE may adjust its uplink configurations (for example, uplink transmission configurations) accordingly. For example, the UE uses a second uplink configuration during the cell-DRX-on time interval and a third uplink configuration during the cell-DRX-off time interval. These uplink configuration changes enable the UE to adapt its transmission behavior based on the current cell-DRX mode. The parameters associated with the cell-DRX uplink may include the duration, timing, and/or offsets of the cell-DRX-on and/or off time intervals.

The UE may synchronize with both the activated state and the deactivated state of the cell-DRX configuration, as well as the cell-DRX-on and off time intervals, in accordance with one or more parameters associated with the cell-DRX configuration.

Various aspects of the present disclosure are directed to dynamically selecting an uplink configuration, by a UE, based on a state of the cell-DRX configuration at the network node. The state of the cell-DRX configuration includes two primary states: an activated state and a deactivated state. In the activated state, the cell-DRX configuration cycles between a cell-DRX-on time interval and a cell-DRX-off time interval. As discussed, the cell-DRX-on time interval refers to a period when the cell-DRX mode is actively monitoring uplink transmissions. The cell-DRX-off time interval refers to a period during which the network node enters a sleep or micro-sleep state, temporarily ceasing the monitoring of uplink transmissions.

Within this context, the dynamic selection of an appropriate uplink transmission configuration by the UE takes into account the state of the cell-DRX configuration at the network node, enabling the UE to adapt its transmission behavior accordingly. By dynamically adjusting the uplink transmission configuration based on the cell-DRX state, the UE may improve its transmission efficiency and align its uplink transmissions in accordance with a current state of the cell-DRX configuration, such that a number of successful uplink transmissions is increased.

Figure 6:
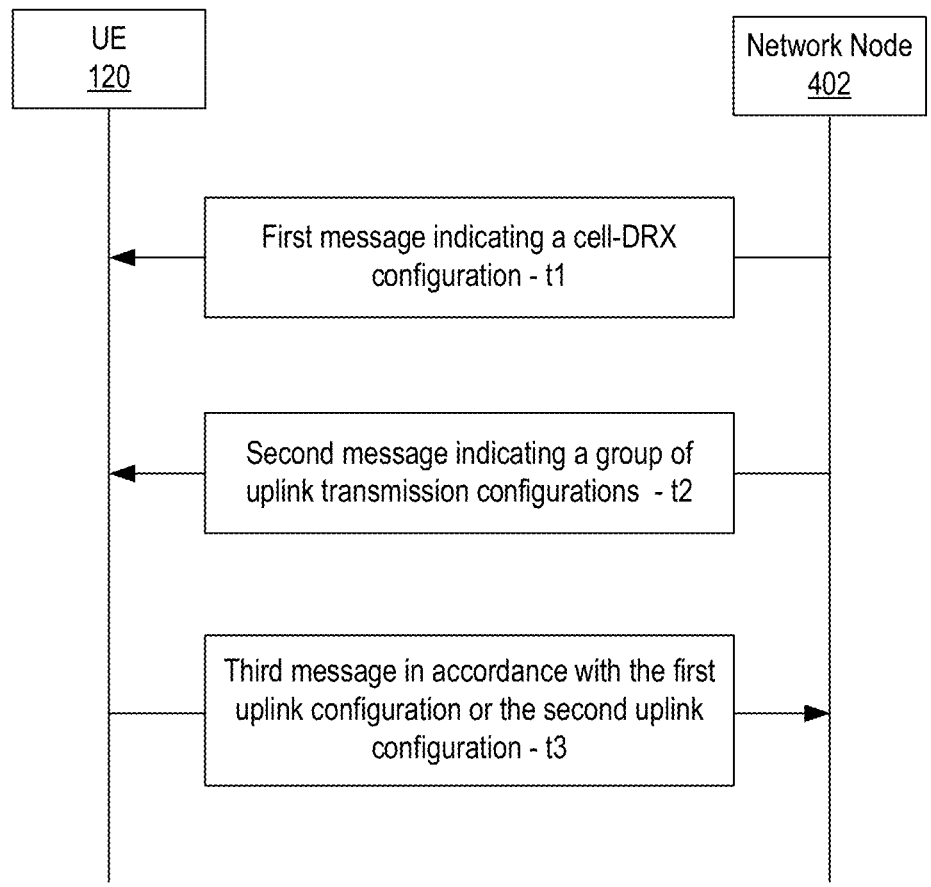
FIG. 6 is a timing diagram illustrating an example of dynamically selecting an uplink transmission configuration, in accordance with various aspects of the present disclosure.

FIG. 6 is a timing diagram illustrating an example 600 of dynamically selecting an uplink transmission configuration, in accordance with aspects of the present disclosure. As shown in the example 600 of FIG. 6, a UE 120 may be associated with a network node 402. As shown in the example 600, at time t1, the UE 120 receives, from the network node 402, a first message indicating a cell-DRX configuration (for example, first cell-DRX configuration) associated with a DRX cycle of the network node 402. The DRX cycle may be enabled, at the network node 402, in accordance with the cell-DRX configuration being in an activated state. The cell-DRX cycle may be disabled, at the network node 402, in accordance with the cell-DRX configuration being in a deactivated state. In some examples, the cell-DRX configuration indicates a first time interval associated with the activated state and a second time interval associated with the deactivated state.

In some examples, after time t1 and before time t2 or t3, the UE 120 may receive, from the network node 402, a message indicating whether the cell-DRX configuration is in the activated state or the deactivated state. In some such examples, the message may be an RRC message. In other examples, the network node 402 may dynamically transmit a message indicating an activation or deactivation of the cell-DRX configuration. As shown in the example 600, at time t2, the UE 120 receives, from the network node 402, a second message indicating a group of uplink transmission configurations including, at least, a first uplink configuration associated with the activated state of the cell-DRX configuration and a second uplink configuration associated with the deactivated state of the cell-DRX configuration. In some examples, the group of uplink configurations also includes a third uplink configuration that is associated with a cell-DRX-off time interval within the enabled cell-DRX cycle. In such examples, the first uplink configuration may be associated with cell-DRX-on time interval within the enabled cell-DRX cycle.

At time t3, the UE 120 transmits, to the network node 402, a third message in accordance with the first uplink configuration or the second uplink configuration. The first uplink configuration may be used in accordance with the cell-DRX configuration being activated. Additionally, the second uplink configuration may be used in accordance with the cell-DRX configuration being deactivated. In some examples, each of the first uplink configuration and the second uplink configuration includes one or more of: one or more SR configurations, one or more SR resource configurations, one or more configured grant (CG)-physical uplink shared channel (PUSCH) configurations, one or more RACH configurations, one or more mask configurations associated with SR transmissions, one or more delay timer configurations, or one or more CG timers. In some examples, one or both of the first uplink configuration or the second uplink configurations include a respective set of UL configurations. For example, the first uplink configuration may include the second uplink configuration and a third uplink configuration. In such examples, activating the first or second uplink configuration may include activating all uplink configurations or a subset of uplink configurations in the respective set of uplink UL configurations in accordance with the cell-DRX configuration being in the activated state or the deactivated state.

In some examples, the first message, received at time t1, further indicates another cell-DRX configuration (for example, second cell-DRX configuration) associated with the network node. The cell-DRX cycle may be enabled at the network node in accordance with the other cell-DRX configuration being in the activated state and disabled at the network node in accordance with the other cell-DRX configuration being in the deactivated state. In such examples, the first UL configuration may be associated with the deactivated state of the other cell-DRX configuration. Furthermore, the second uplink configuration may be associated with the activated state of the other cell-DRX configuration. Additionally, in some examples (not shown in the example 600), the UE 120 may receive, from the network node 402, a message indicating whether the first cell-DRX configuration or the second cell-DRX configuration is in the activated state. In such examples, the message may be an RRC message or dynamic signaling.

In some examples, each of the first UL configuration and the second UL configuration is associated with a respective logical channel configuration or a respective logical channel group configuration. For example, one or more uplink configurations may be associated with a specific logical channel. In some examples, one logical channel configuration may be associated with multiple SR configurations or SR resource configurations. In such examples, one or more SR configurations may be deactivated if the cell-DRX configuration is activated or during a cell-DRX-off time interval.

Figure 7:
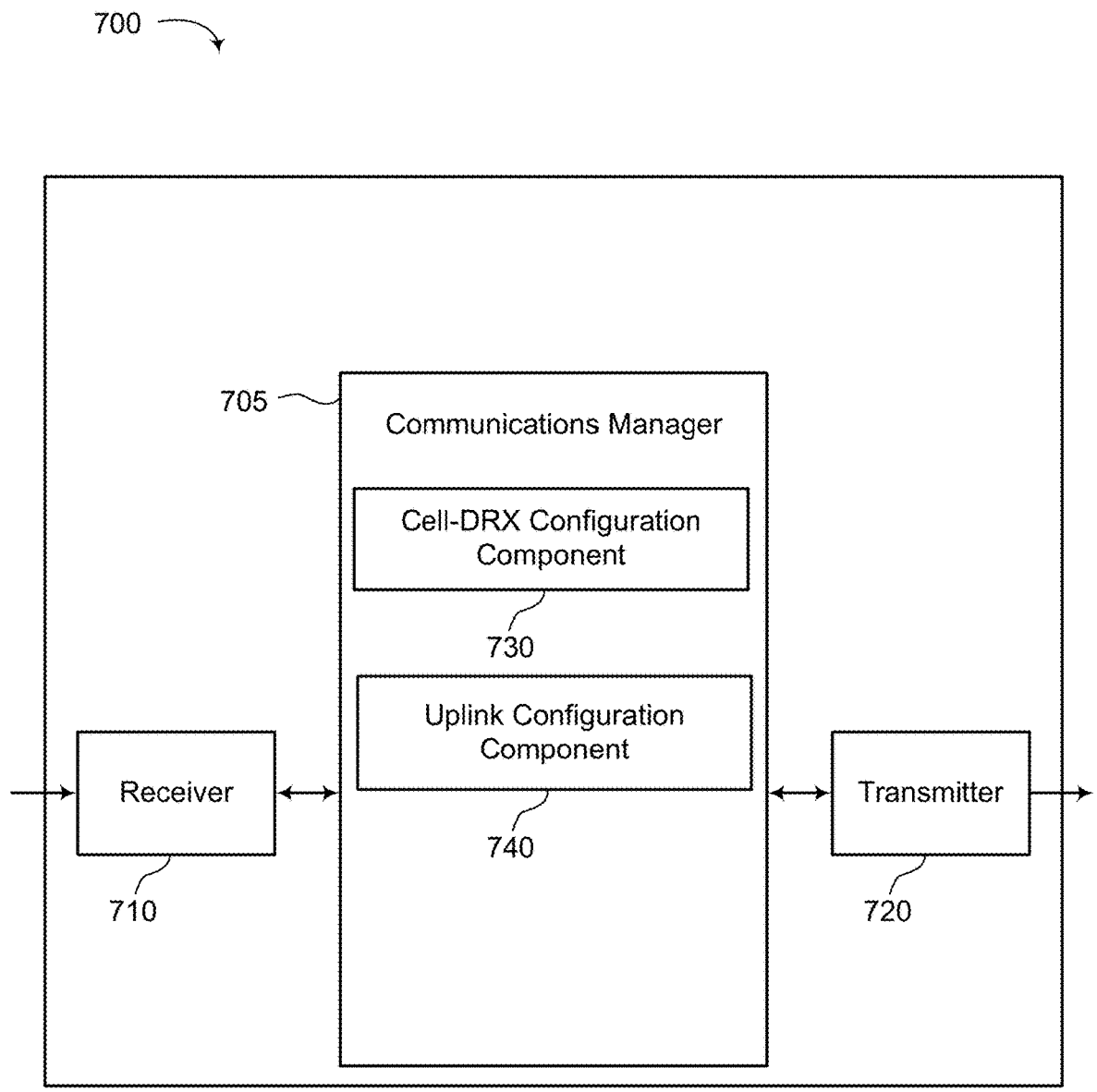
FIG. 7 is a block diagram illustrating an example wireless communication device that supports dynamically selecting an uplink configuration based on a current state of a cell-DRX configuration, in accordance with various aspects of the present disclosure.

FIG. 7 is a block diagram illustrating an example wireless communication device 700 that supports dynamically selecting an uplink configuration based on a current stated of a cell-DRX configuration, in accordance with aspects of the present disclosure. The wireless communication device 700 may be an example of aspects of a UE 120 described with reference to FIGS. 1, 2, and 3. The wireless communication device 700 may include a receiver 710, a communications manager 705, a cell-DRX configuration component 730, an uplink configuration component 740, and a transmitter 720, which may be in communication with one another (for example, via one or more buses). In some examples, the wireless communication device 700 is configured to perform operations, including operations of the process 800 described below with reference to FIG. 8.

In some examples, the wireless communication device 700 can include a chip, system on chip (SOC), chipset, package, or device that includes at least one processor and at least one modem (for example, a 5G modem or other cellular modem). In some examples, the communications manager 705, or its sub-components, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a physical shared control channel (PSCCH)) and data channels (for example, a PUSCH or a physical sidelink shared channel (PSSCH)).

The received information may be passed on to other components of the wireless communication device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252 described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 264 described with reference to FIG. 2. The transmitter 720 may be coupled with or otherwise utilize a set of antennas (for example, the set of antennas may be an example of aspects of the antennas 252), which may be antenna elements shared with the receiver 710. In some examples, the transmitter 720 is configured to transmit.

The communications manager 705 may be an example of aspects of the controller/processor 280 described with reference to FIG. 2. The communications manager 705 includes the cell-DRX configuration component 730 and the uplink configuration component 740. In some examples, working in conjunction with the receiver 710, the cell-DRX configuration component 730 receives, from a network node, a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. Additionally, working in conjunction with the receiver 710, the uplink configuration component 740 receives, from the network node, a second message indicating a group of UL transmission configurations including at least a first UL configuration associated with the activated state of the first DRX configuration and a second UL configuration associated with the deactivated state of the first DRX configuration. Finally, working in conjunction with the transmitter 720, the uplink configuration component 740 transmits, to the network node, a third message in accordance with the first UL configuration in accordance with first DRX configuration being activated or the second UL configuration in accordance with first DRX configuration being deactivated.

Figure 8:
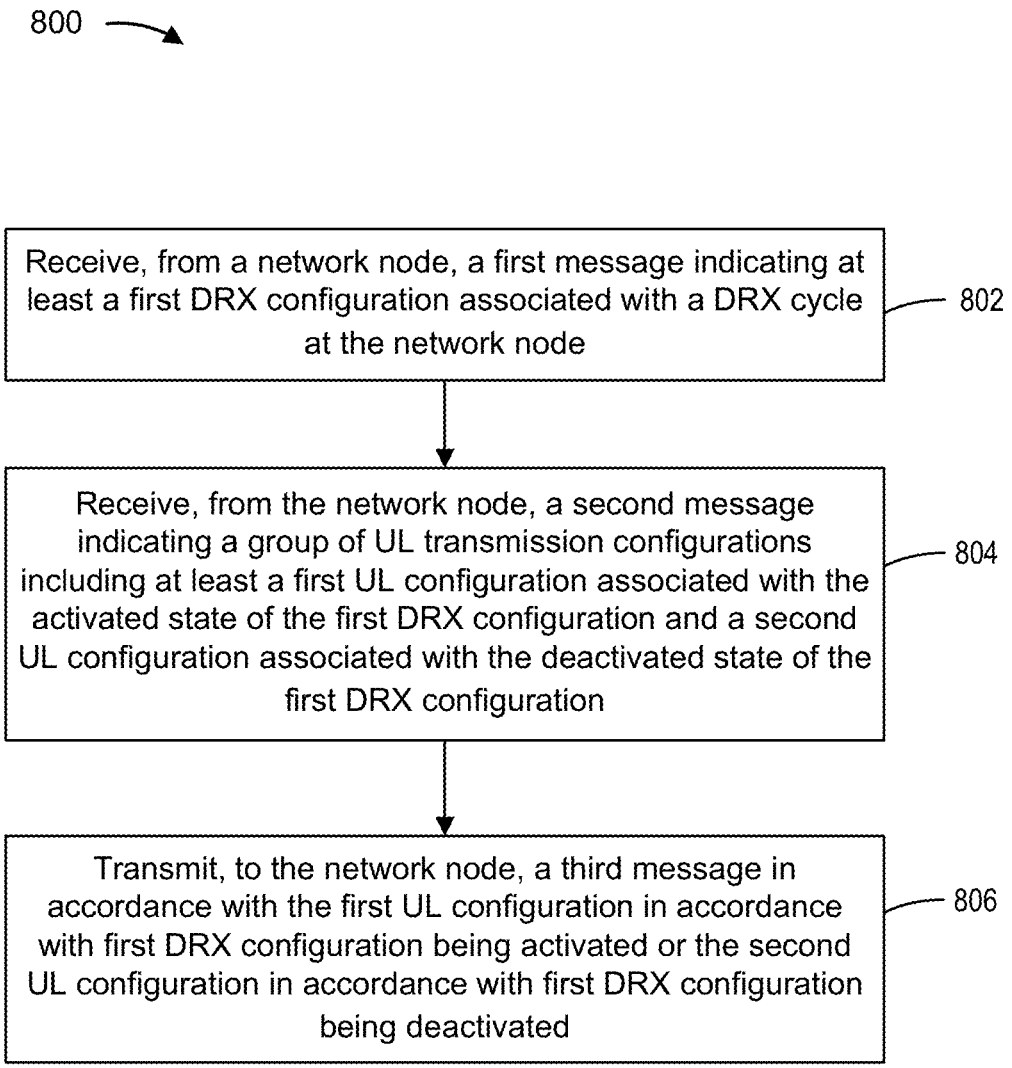
FIG. 8 is a flow diagram illustrating an example process of dynamically selecting an uplink configuration based on a current state of a cell-DRX configuration, in accordance with various aspects of the present disclosure.

FIG. 8 is a flow diagram illustrating an example process 800 performed, for example, by a UE, in accordance with various aspects of the present disclosure. The example process 800 is an example of dynamically selecting an uplink configuration based on a current stated of a cell-DRX configuration. As shown in the example of FIG. 8, the process begins at block 802 by receiving, from a network node, a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. At block 804, the process 800 receives, from the network node, a second message indicating a group of UL transmission configurations including at least a first UL configuration associated with the activated state of the first DRX configuration and a second UL configuration associated with the deactivated state of the first DRX configuration. At block 806, the process 800 transmits, to the network node, a third message in accordance with the first UL configuration in accordance with first DRX configuration being activated or the second UL configuration in accordance with first DRX configuration being deactivated.

Figure 9:
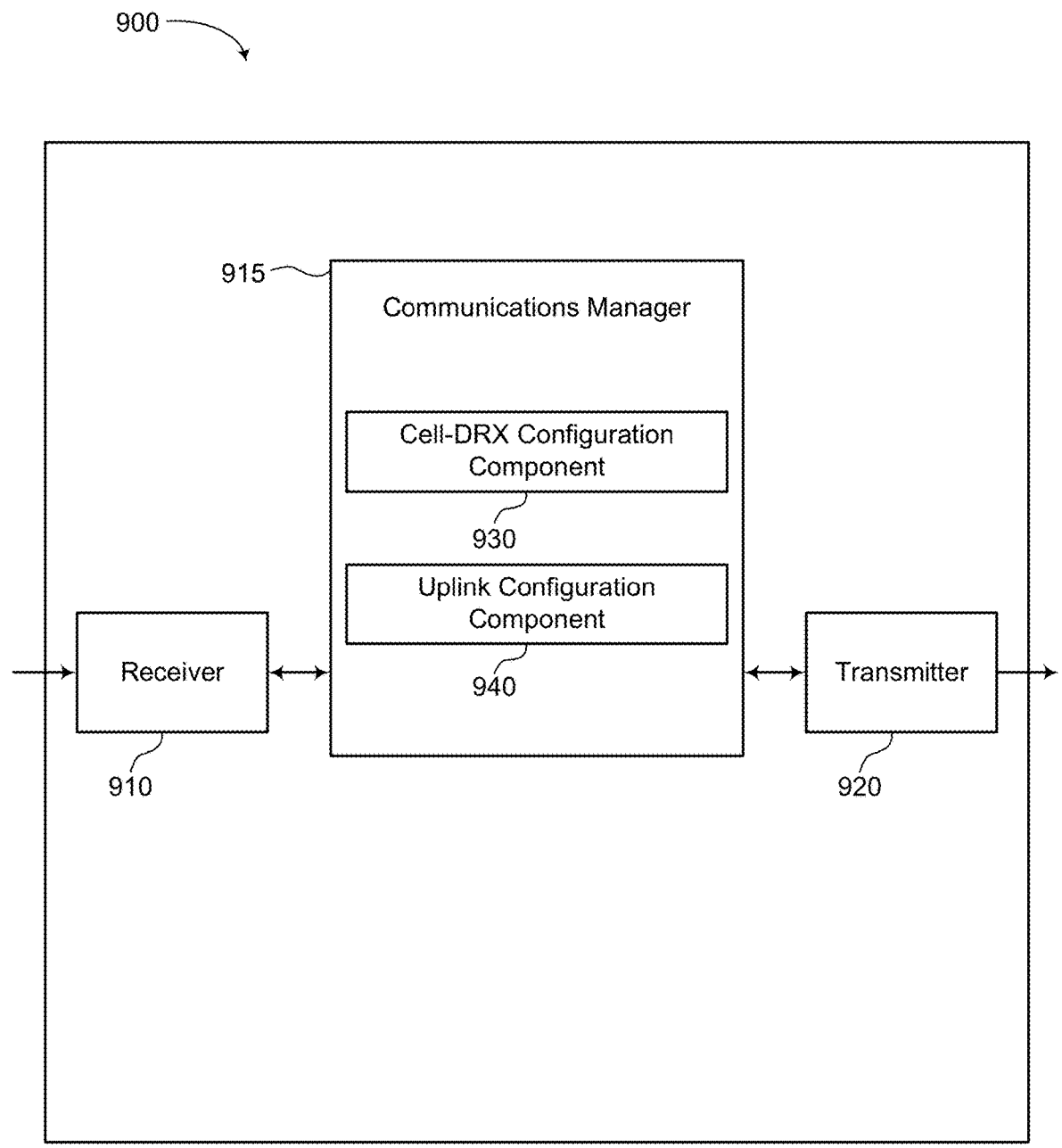
FIG. 9 is a block diagram illustrating an example wireless communication device that supports dynamically activating cell-DRX configuration, in accordance with various aspects of the present disclosure.

FIG. 9 is a block diagram illustrating an example wireless communication device 900 that supports dynamically activating a cell-DRX configuration, in accordance with aspects of the present disclosure. The wireless communication device 900 may be an example of a base station 110 described with reference to FIGS. 1, 2, and 4, a DU 330 described with reference to FIG. 3, a CU 310 described with reference to FIG. 3, or a network node 402 described with reference to FIGS. 4 and 6. The wireless communication device 900 may include a receiver 910, a communications manager 915, a cell-DRX configuration component 930, an uplink configuration component 940, and a transmitter 920, which may be in communication with one another (for example, via one or more buses). In some examples, the wireless communication device 900 is configured to perform operations, including operations of the process 1000 described below with reference to FIG. 10.

In some examples, the wireless communication device 900 can include a chip, system on chip (SOC), chipset, package, or device that includes at least one processor and at least one modem (for example, a 5G modem or other cellular modem). In some examples, the communications manager 915, or its sub-components, may be separate and distinct components. In some examples, at least some components of the communications manager 915 are implemented at least in part as software stored in a memory. For example, portions of one or more of the components of the communications manager 915 can be implemented as non-transitory code executable by the processor to perform the functions or operations of the respective component.

The receiver 910 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, a UE 120, described with reference to FIGS. 1-4.

The received information may be passed on to other components of the wireless communication device 900. The receiver 910 may be an example of aspects of the receive processor 238 described with reference to FIG. 2. The receiver 910 may include a set of radio frequency (RF) chains that are coupled with or otherwise utilize a set of antennas (for example, the set of antennas may be an example of aspects of the antennas 234 described with reference to FIG. 2).

The transmitter 920 may transmit signals generated by the communications manager 915 or other components of the wireless communication device 900. In some examples, the transmitter 920 may be collocated with the receiver 910 in a transceiver. The transmitter 920 may be an example of aspects of the transmit processor 220 described with reference to FIG. 2. The transmitter 920 may be coupled with or otherwise utilize a set of antennas (for example, the set of antennas may be an example of aspects of the antennas 234), which may be antenna elements shared with the receiver 910. In some examples, the transmitter 920 is configured to transmit control information in a PDCCH or a PSCCH and data in a physical downlink shared channel (PDSCH) or PSSCH.

The communications manager 915 may be an example of aspects of the controller/processor 240 described with reference to FIG. 2. The communications manager 915 includes the cell-DRX configuration component 930 and the uplink configuration component 940. In some examples, working in conjunction with the transmitter 920, the cell-DRX configuration component 930 transmits a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. Additionally, working in conjunction with the transmitter 920, the uplink configuration component 940 transmits a second message indicating a group of UL transmission configurations including at least a first UL configuration associated with the activated state of the first DRX configuration and a second UL configuration associated with the deactivated state of the first DRX configuration. Finally, working in conjunction with one or more of the receiver 910, the cell-DRX configuration component 930, and the uplink configuration component 940, the network node receives, from a UE, a third message in accordance with the first UL configuration in accordance with first DRX configuration being activated or the second UL configuration in accordance with first DRX configuration being deactivated.

Figure 10:
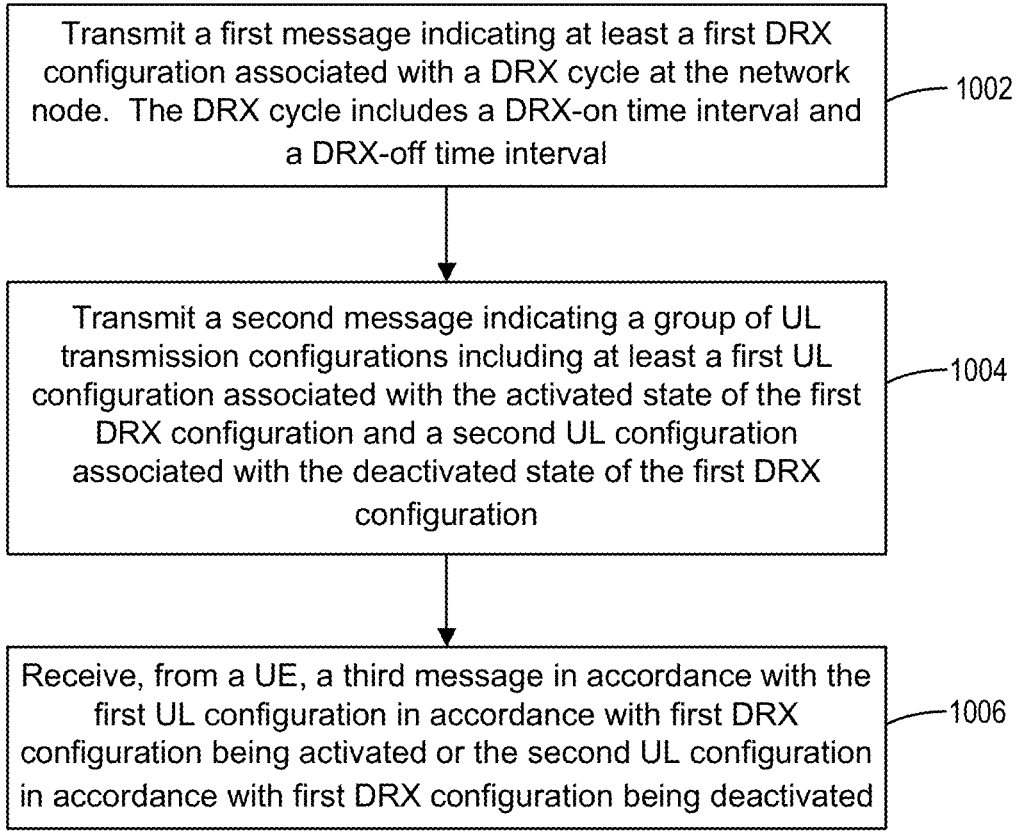
FIG. 10 is a flow diagram illustrating an example process of receiving uplink transmissions in accordance with a current state of a cell-DRX configuration, in accordance with various aspects of the present disclosure

FIG. 10 is a flow diagram illustrating an example of a process 1000 performed by network node, in accordance with some aspects of the present disclosure. The wireless device may be an example of a base station 110 described with reference to FIGS. 1, 2, and 4, a DU 330 described with reference to FIG. 3, a CU 310 described with reference to FIG. 3, or a network node 402 described with reference to FIGS. 4 and 6. The example process 1000 is an example of receiving multiple PRACH transmissions from a single UE. As shown in FIG. 10, the process 1000 begins at block 1002, by transmitting a first message indicating at least a first DRX configuration associated with a DRX cycle at the network node. The DRX cycle includes a DRX-on time interval and a DRX-off time interval. The DRX cycle may be enabled, at the network node, in accordance with the first DRX configuration being in an activated state, and the DRX cycle may be disabled, at the network node, in accordance with the first DRX configuration being in a deactivated state. At block 1004, the process 1000 transmits a second message indicating a group of UL transmission configurations including at least a first UL configuration associated with the activated state of the first DRX configuration and a second UL configuration associated with the deactivated state of the first DRX configuration. At block 1006, the process 1000 receives, from a UE, a third message in accordance with the first UL configuration in accordance with first DRX configuration being activated or the second UL configuration in accordance with first DRX configuration being deactivated.

Implementation examples are described in the following numbered clauses:

Clause 1. A method for wireless communication at a user equipment (UE), comprising: receiving, from a network node, a first message indicating at least a first DRX configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state; receiving, from the network node, a second message indicating a group of UL transmission configurations including at least a first UL configuration associated with the activated state of the first DRX configuration and a second UL configuration associated with the deactivated state of the first DRX configuration; and transmitting, to the network node, a third message in accordance with the first UL configuration in accordance with first DRX configuration being activated or the second UL configuration in accordance with first DRX configuration being deactivated.

Clause 2. The method of Clause 1, wherein the first DRX configuration indicates a first time interval associated with the activated state and a second time interval associated with the deactivated state.

Clause 3. The method of any one of Clauses 1-2, further comprising receiving, from the network node, a fourth message indicating whether the first DRX configuration is in the activated state or the deactivated state.

Clause 4. The method of Clause 3, wherein the fourth message is an RRC message.

Clause 5. The method of any one of Clauses 1-4, wherein: the group of UL configurations further includes a third UL configuration that is associated with the DRX-off time interval; and the first UL configuration is associated with the DRX-on time interval.

Clause 6. The method of any one of Clauses 1, wherein: the first message further indicates a second DRX configuration associated with the network node; the DRX cycle is enabled at the network node in accordance with the second DRX configuration being in the activated state and disabled at the network node in accordance with the second DRX configuration being in the deactivated state; the first UL configuration is associated with the deactivated state of the second DRX configuration; and the second UL configuration is associated with the activated state of the second DRX configuration.

Clause 7. The method of Clause 6, further comprising receiving, from the network node, a fourth message indicating whether the first DRX configuration or the second DRX configuration is in the activated state.

Clause 8. The method of any one of Clauses 1-7, wherein: one or both of the first UL configuration or the second UL configurations include a respective set of UL configurations; and the method further comprises activating all UL configurations or a subset of UL configurations in the respective set of UL configurations in accordance with the first DRX configuration being in the activated state or the deactivated state.

Clause 9. The method of any one of Clauses 1-8, wherein each of the first UL configuration and the second UL configuration includes one or more of: one or more SR configurations, one or more SR resource configurations, one or more CG-PUSCH configurations, one or more RACH configurations, one or more mask configurations associated with SR transmissions, one or more delay timer configurations, or one or more CG timers.

Clause 10. The method of any one of Clauses 1-9, wherein each of the first UL configuration and the second UL configuration is associated with a respective logical channel configuration or a respective logical channel group configuration.

Clause 11. A method for wireless communication at a network node, comprising: transmitting a first message indicating at least a first DRX configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state; transmitting a second message indicating a group of UL transmission configurations including at least a first UL configuration associated with the activated state of the first DRX configuration and a second UL configuration associated with the deactivated state of the first DRX configuration; and receiving, from a UE, a third message in accordance with the first UL configuration in accordance with first DRX configuration being activated or the second UL configuration in accordance with first DRX configuration being deactivated.

Clause 12. The method of Clause 11, wherein the first DRX configuration indicates a first time interval associated with the activated state and a second time interval associated with the deactivated state.

Clause 13. The method of any one of Clauses 11-12, further comprising transmitting a fourth message indicating whether the first DRX configuration is in the activated state or the deactivated state.

Clause 14. The method of Clause 13, wherein the fourth message is an RRC message.

Clause 15. The method of any one of Clauses 11-14, wherein: the group of UL configurations further includes a third UL configuration that is associated with the DRX-off time interval; and the first UL configuration is associated with the DRX-on time interval.

Clause 16. The method of any one of Clauses 11-15, wherein: the first message further indicates a second DRX configuration associated with the network node;

the DRX cycle is enabled at the network node in accordance with the second DRX configuration being in the activated state and disabled at the network node in accordance with the second DRX configuration being in the deactivated state; the first UL configuration is associated with the deactivated state of the second DRX configuration; and the second UL configuration is associated with the activated state of the second DRX configuration.

Clause 17. The method of Clause 16, further comprising transmitting a fourth message indicating whether the first DRX configuration or the second DRX configuration is in the activated state.

Clause 18. The method of any one of Clauses 11-17, wherein: one or both of the first UL configuration or the second UL configurations include a respective set of UL configurations; and the method further comprises activating all UL configurations or a subset of UL configurations in the respective set of UL configurations in accordance with the first DRX configuration being in the activated state or the deactivated state.

Clause 19. The method of any one of Clauses 11-18, wherein each of the first UL configuration and the second UL configuration includes one or more of: one or more SR configurations, one or more SR resource configurations, one or more CG-PUSCH configurations, one or more RACH configurations, one or more mask configurations associated with SR transmissions, one or more delay timer configurations, or one or more CG timers.

Clause 20. The method of any one of Clauses 11-19, wherein each of the first UL configuration and the second UL configuration is associated with a respective logical channel configuration or a respective logical channel group configuration.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:
    receiving, from a network node, a first message indicating at least a first discontinuous reception (DRX) configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state;
    receiving, from the network node, a second message indicating a group of uplink (UL) transmission configurations including at least a first UL configuration associated with the activated state of the first DRX configuration and a second UL configuration associated with the deactivated state of the first DRX configuration; and
    transmitting, to the network node, a third message in accordance with the first UL configuration in accordance with first DRX configuration being activated or the second UL configuration in accordance with first DRX configuration being deactivated.

2. The method of claim 1, wherein the first DRX configuration indicates a first time interval associated with the activated state and a second time interval associated with the deactivated state.

3. The method of claim 1, further comprising receiving, from the network node, a fourth message indicating whether the first DRX configuration is in the activated state or the deactivated state.

4. The method of claim 3, wherein the fourth message is a radio resource control (RRC) message.

5. The method of claim 1, wherein:
    the group of UL configurations further includes a third UL configuration that is associated with the DRX-off time interval; and
    the first UL configuration is associated with the DRX-on time interval.

6. The method of claim 1, wherein:
the first message further indicates a second DRX configuration associated with the network node;
the DRX cycle is enabled at the network node in accordance with the second DRX configuration being in the activated state and disabled at the network node in accordance with the second DRX configuration being in the deactivated state;
the first UL configuration is associated with the deactivated state of the second DRX configuration; and
the second UL configuration is associated with the activated state of the second DRX configuration.

7. The method of claim 6, further comprising receiving, from the network node, a fourth message indicating whether the first DRX configuration or the second DRX configuration is in the activated state.

8. The method of claim 1, wherein:
one or both of the first UL configuration or the second UL configurations include a respective set of UL configurations; and
the method further comprises activating all UL configurations or a subset of UL configurations in the respective set of UL configurations in accordance with the first DRX configuration being in the activated state or the deactivated state.

9. The method of claim 1, wherein each of the first UL configuration and the second UL configuration includes one or more of: one or more scheduling request (SR) configurations, one or more SR resource configurations, one or more configured grant (CG)-physical uplink shared channel (PUSCH) configurations, one or more random access channel (RACH) configurations, one or more mask configurations associated with SR transmissions, one or more delay timer configurations, or one or more CG timers.

10. The method of claim 1, wherein each of the first UL configuration and the second UL configuration is associated with a respective logical channel configuration or a respective logical channel group configuration.

11. A user equipment (UE), comprising:
one or more processors; and
one or more memories coupled with the one or more processors and storing processor-executable code that, when executed by the one or more processors, is configured to cause the UE to:
receive, from a network node, a first message indicating at least a first discontinuous reception (DRX) configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state;
receive, from the network node, a second message indicating a group of uplink (UL) transmission configurations including at least a first UL configuration associated with the activated state of the first DRX configuration and a second UL configuration associated with the deactivated state of the first DRX configuration; and
transmit, to the network node, a third message in accordance with the first UL configuration in accordance with first DRX configuration being activated or the second UL configuration in accordance with first DRX configuration being deactivated.

12. The UE of claim 11, wherein:
the group of UL configurations further includes a third UL configuration that is associated with the DRX-off time interval; and
the first UL configuration is associated with the DRX-on time interval.

13. The UE of claim 11, wherein:
the first message further indicates a second DRX configuration associated with the network node;
the DRX cycle is enabled at the network node in accordance with the second DRX configuration being in the activated state and disabled at the network node in accordance with the second DRX configuration being in the deactivated state;
the first UL configuration is associated with the deactivated state of the second DRX configuration; and
the second UL configuration is associated with the activated state of the second DRX configuration.

14. The UE of claim 13, wherein execution of the processor-executable code further cause the UE to receive, from the network node, a fourth message indicating whether the first DRX configuration or the second DRX configuration is in the activated state.

15. The UE of claim 1, wherein each of the first UL configuration and the second UL configuration includes one or more of: one or more scheduling request (SR) configurations, one or more SR resource configurations, one or more configured grant (CG)-physical uplink shared channel (PUSCH) configurations, one or more random access channel (RACH) configurations, one or more mask configurations associated with SR transmissions, one or more delay timer configurations, or one or more CG timers.

16. A method for wireless communication by a network node, comprising:
transmitting a first message indicating at least a first discontinuous reception (DRX) configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state;
transmitting a second message indicating a group of uplink (UL) transmission configurations including at least a first UL configuration associated with the activated state of the first DRX configuration and a second UL configuration associated with the deactivated state of the first DRX configuration; and
receiving, from a user equipment (UE), a third message in accordance with the first UL configuration in accordance with first DRX configuration being activated or the second UL configuration in accordance with first DRX configuration being deactivated.

17. The method of claim 16, wherein the first DRX configuration indicates a first time interval associated with the activated state and a second time interval associated with the deactivated state.

18. The method of claim 16, further comprising transmitting a fourth message indicating whether the first DRX configuration is in the activated state or the deactivated state.

19. The method of claim 18, wherein the fourth message is a radio resource control (RRC) message.

20. The method of claim 16, wherein:
the group of UL configurations further includes a third UL configuration that is associated with the DRX-off time interval; and the first UL configuration is associated with the DRX-on time interval.

21. The method of claim 16, wherein:
the first message further indicates a second DRX configuration associated with the network node;
the DRX cycle is enabled at the network node in accordance with the second DRX configuration being in the activated state and disabled at the network node in accordance with the second DRX configuration being in the deactivated state;
the first UL configuration is associated with the deactivated state of the second DRX configuration; and
the second UL configuration is associated with the activated state of the second DRX configuration.

22. The method of claim 21, further comprising transmitting a fourth message indicating whether the first DRX configuration or the second DRX configuration is in the activated state.

23. The method of claim 16, wherein:
one or both of the first UL configuration or the second UL configurations include a respective set of UL configurations; and
the method further comprises activating all UL configurations or a subset of UL configurations in the respective set of UL configurations in accordance with the first DRX configuration being in the activated state or the deactivated state.

24. The method of claim 16, wherein each of the first UL configuration and the second UL configuration includes one or more of: one or more scheduling request (SR) configurations, one or more SR resource configurations, one or more configured grant (CG)-physical uplink shared channel (PUSCH) configurations, one or more random access channel (RACH) configurations, one or more mask configurations associated with SR transmissions, one or more delay timer configurations, or one or more CG timers.

25. The method of claim 16, wherein each of the first UL configuration and the second UL configuration is associated with a respective logical channel configuration or a respective logical channel group configuration.

26. A network node, comprising:
one or more processors; and
one or more memories coupled with the one or more processors and storing processor-executable code that, when executed by the one or more processors, is configured to cause the network node to:
transmit a first message indicating at least a first discontinuous reception (DRX) configuration associated with a DRX cycle at the network node, the DRX cycle including a DRX-on time interval and a DRX-off time interval, the DRX cycle being enabled, at the network node, in accordance with the first DRX configuration being in an activated state, and the DRX cycle being disabled, at the network node, in accordance with the first DRX configuration being in a deactivated state;
transmit a second message indicating a group of uplink (UL) transmission configurations including at least a first UL configuration associated with the activated state of the first DRX configuration and a second UL configuration associated with the deactivated state of the first DRX configuration; and
receive, from a user equipment (UE), a third message in accordance with the first UL configuration in accordance with first DRX configuration being activated or the second UL configuration in accordance with first DRX configuration being deactivated.

27. The network node of claim 26, wherein:
the group of UL configurations further includes a third UL configuration that is associated with the DRX-off time interval; and
the first UL configuration is associated with the DRX-on time interval.

28. The network node of claim 26, wherein:
the first message further indicates a second DRX configuration associated with the network node;
the DRX cycle is enabled at the network node in accordance with the second DRX configuration being in the activated state and disabled at the network node in accordance with the second DRX configuration being in the deactivated state;
the first UL configuration is associated with the deactivated state of the second DRX configuration; and
the second UL configuration is associated with the activated state of the second DRX configuration.

29. The network node of claim 28, wherein execution of the processor-executable code further cause the network node to transmit a fourth message indicating whether the first DRX configuration or the second DRX configuration is in the activated state.

30. The network node of claim 26, wherein each of the first UL configuration and the second UL configuration includes one or more of: one or more scheduling request (SR) configurations, one or more SR resource configurations, one or more configured grant (CG)-physical uplink shared channel (PUSCH) configurations, one or more random access channel (RACH) configurations, one or more mask configurations associated with SR transmissions, one or more delay timer configurations, or one or more CG timers.

* * * * *